Aug. 19, 1958   R. J. JASPER   2,848,100
SWING CONVEYORS
Filed Dec. 19, 1955   3 Sheets-Sheet 1
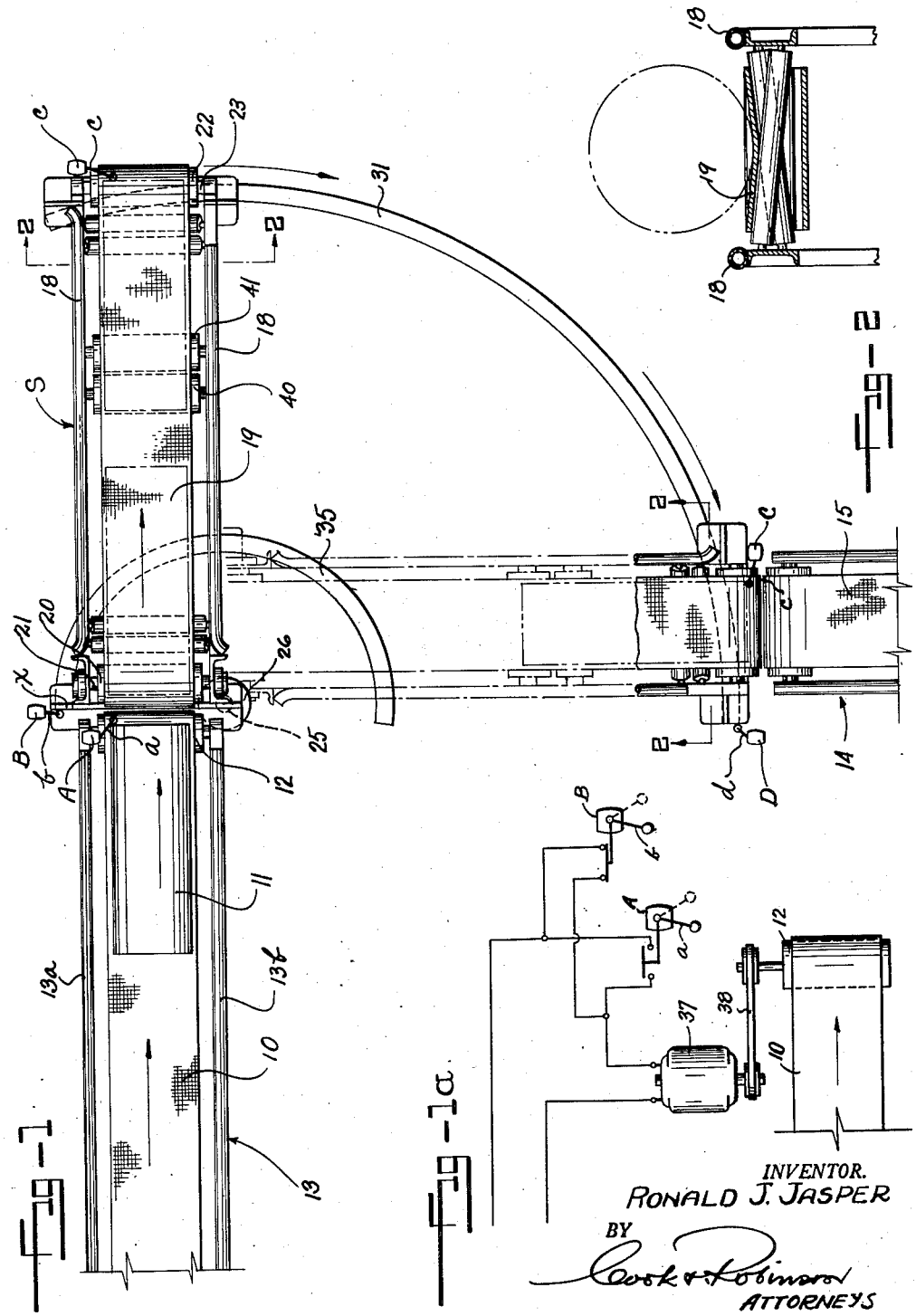
INVENTOR.
RONALD J. JASPER
BY
Cook & Robinson
ATTORNEYS Aug. 19, 1958  R. J. JASPER  2,848,100
SWING CONVEYORS
Filed Dec. 19, 1955  3 Sheets-Sheet 2
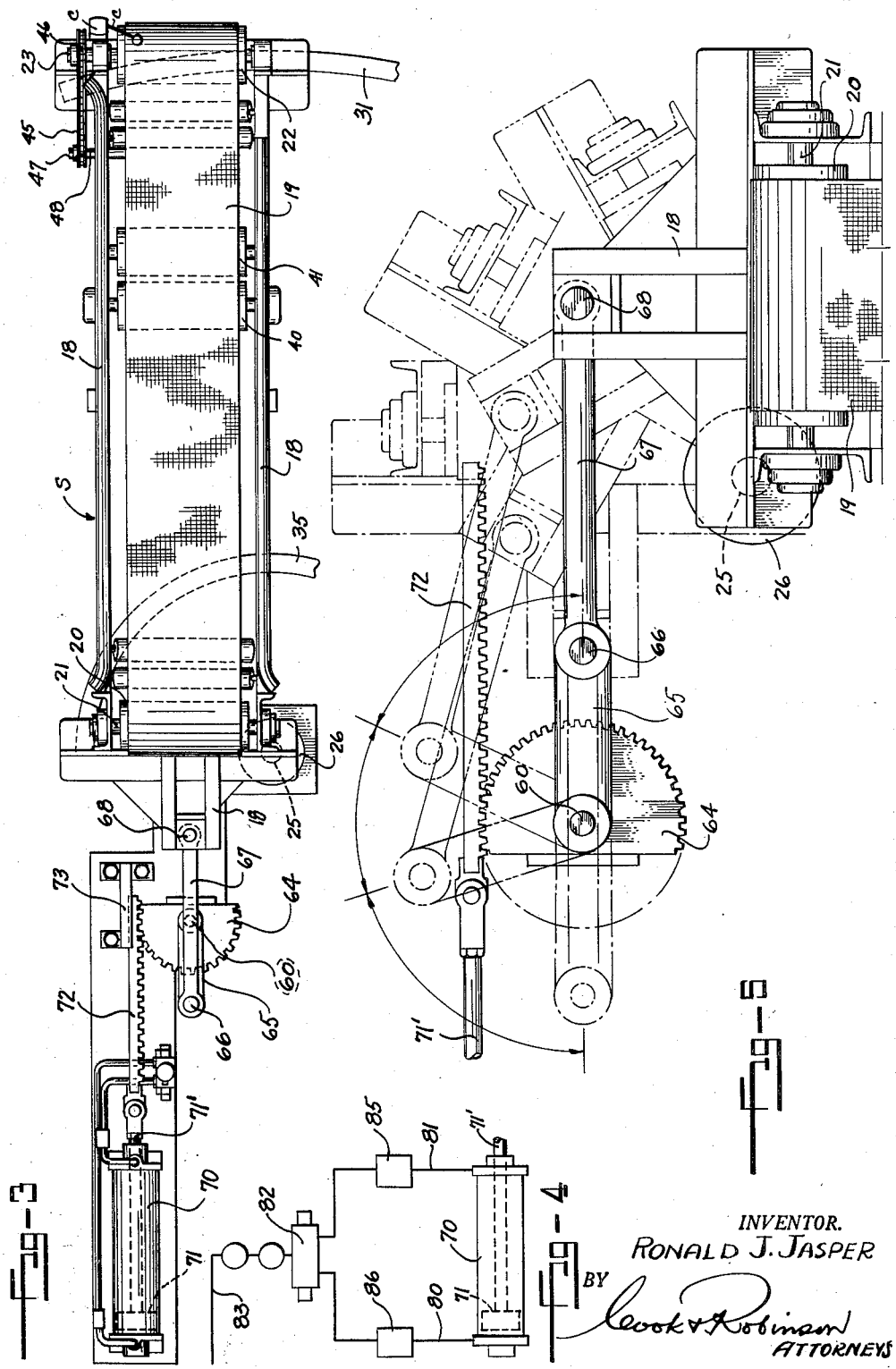
INVENTOR.
RONALD J. JASPER
BY
Cook & Robinson
ATTORNEYS

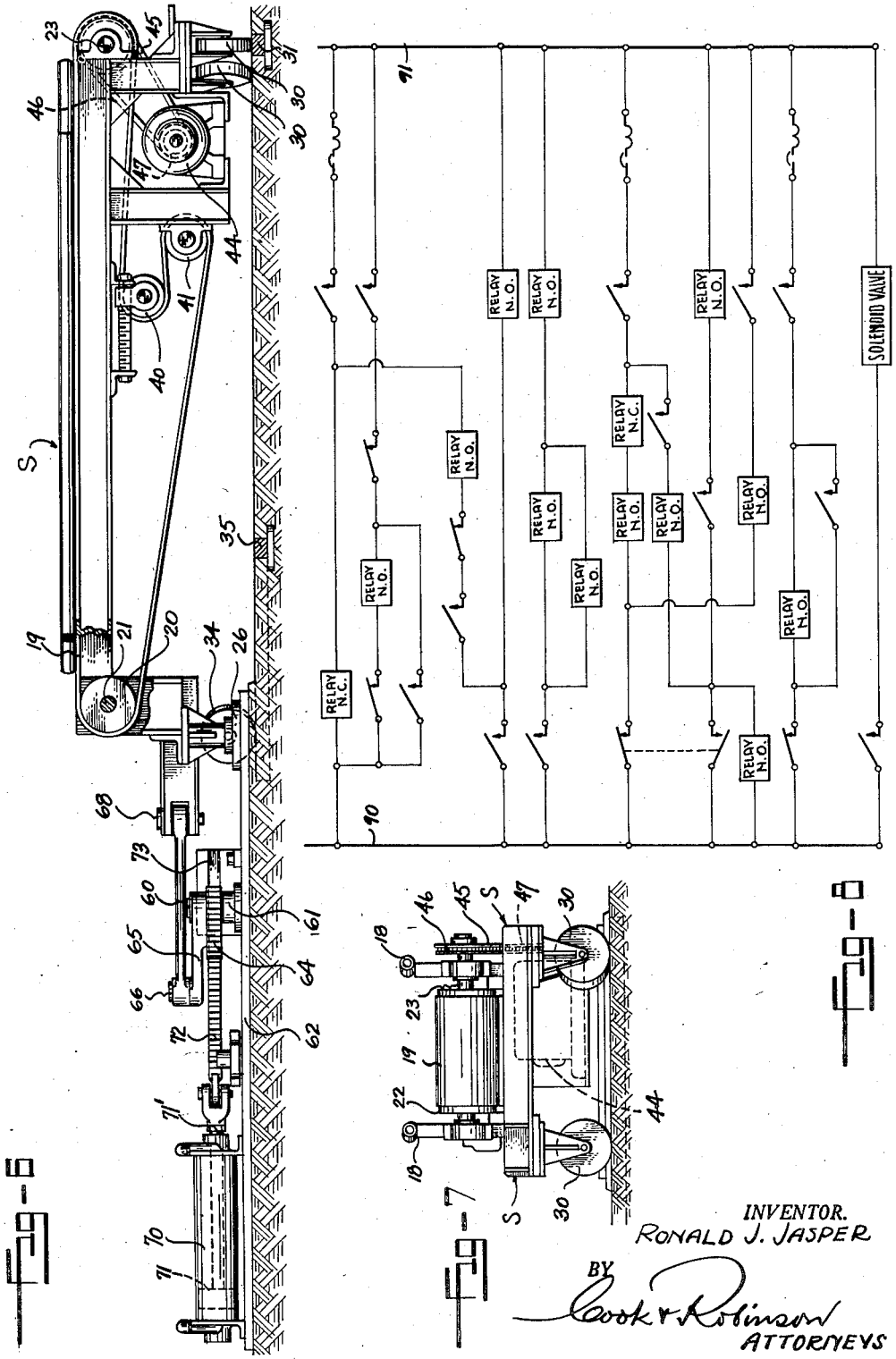

United States Patent Office 2,848,100
Patented Aug. 19, 1958

2,848,100

SWING CONVEYORS

Ronald J. Jasper, Hoquiam, Wash., assignor to Lamb-Grays Harbor Co., Inc., Hoquiam, Wash., a corporation of Washington Application December 19, 1955, Serial No. 553,933

5 Claims. (Cl. 198—100)

This invention relates to conveyors, and it has reference more particularly to improvements in mechanisms known as "swing conveyors" and especially to swing conveyors designed for the conveying of large, heavy objects, such as paper and pulp rolls, around sharp turns. Furthermore, it relates to swing conveyors onto which paper rolls, or the like, may be received endwise, turned and advanced endwise therefrom and onto a discharge conveyor operating at an angle relative to the feed conveyor.

Heretofore swing conveyors have been built and used quite extensively for various purposes but to my knowledge have always been operated approximately at a constant rotating or swinging velocity. Thus, whenever the conveyed objects were quite heavy and bulky, the swinging speed was necessarily limited in order not to cause inertial displacement of the load from the conveyor upon starting and stopping. Attempts to eliminate such objectionable results have been made in various ways such, for example, by incorporation of fluid couplings in the conveyor swinging means but without complete success.

In view of the foregoing statement, it has been the primary object of this invention to provide a swing conveyor mechanism that is characterized by the provision in connection therewith of a novel driving mechanism, whereby the sudden starting and stopping is eliminated and whereby a smooth, harmonic motion is provided which starts the swing of the conveyor very slowly, accelerates it to the maximum velocity during the first half of its travel and then decelerates during the second half of its travel and brings it to a gradual stop.

It is also an object of the present invention to provide a swing conveyor with a driving means of the character above stated, and equipped with novel controls whereby the various operations of the conveyor in receiving its load, swinging, conveying, discharging and then returning to starting position are automatically controlled.

It is also an object to provide means for causing the load to be advanced along the conveyor during its swinging movement.

It is also an object of the invention to provide for oscillating the swing conveyor between receiving and discharging stations by use of a power means, such as an air or hydraulic cylinder, or an electric, hydraulic or air motor, equipped with regulators whereby the rate of its travel in opposite directions may be independently controlled.

Still further objects and advantages of the present invention reside in the details of construction and relationship of the parts comprised in the power operated means for the oscillation of the swing conveyor and in the mode of operation of said power operated means as will hereinafter be fully described.

In accomplishing the above mentioned and other objects of the invention, I have provided the improved details of construction, the preferred forms of which are illustrated in the accompanying drawings wherein:

Fig. 1 is a general plan view of a swing conveyor mechanism embodied by the present invention.

Fig. 1a is a diagrammatic showing of the feed conveyor drive and the driving motor control switch.

Fig. 2 is a cross-section of the swing conveyor taken substantially on the line 2—2 in Fig. 1.

Fig. 3 is an enlargement of parts shown in Fig. 1, showing the swing conveyor in plan view and its swinging mechanism whereby the harmonic motion is obtained.

Fig. 4 is a diagrammatic illustration of the pneumatic cylinder, its connections with the pressure lines and its controls.

Fig. 5 is an enlarged plan view of the present conveyor swinging mechanism.

Fig. 6 is a side elevation of the conveyor mechanism as shown in Fig. 3.

Fig. 7 is an elevation of the swing conveyor as seen from the right hand end in Fig. 6.

Fig. 8 is a wiring diagram for the various electrical devices used in controlling the operations of the present conveyor mechanism.

Referring more in detail to the drawings:

First, giving consideration to Fig. 1: 10 designates a commonly used form of continuous belt conveyor on which large, heavy objects such as rolls of paper or pulp, designated herein by numeral 11, may be conveyed. The belt 10, which will herein be designated as the "feed belt," operates at its discharge end about a driven roller 12 mounted by the opposite side frames 13a and 13b, of a conveyor frame structure designated in its entirety by numeral 13.

Similarly mounted in another conveying frame structure designated in its entirely by numeral 14, and in angular relationship to the direction of delivery of feed belt 10, is a continuous conveyor belt 15, hereinafter designated as the "discharge belt." In this showing, the belt 15 operates at a 90 degree angle to the direction of travel of belt 10, but this angle might be more or less. In the operation of this conveyor system, the paper rolls 11 are conveyed endwise on belt 10 and discharged endwise therefrom onto the present swing conveyor, designated in its entirety by reference character S, for conveyance thereby and their delivery therefrom onto the belt 15 of the discharge conveyor. With the discharge of a conveyed roll onto the belt 15, the swing conveyor is automatically returned to starting position.

The swing conveyor S comprises a horizontal, elongated frame structure having opposite side frames 18—18, between which a continuous conveyor belt 19 is horizontally supported. This belt operates, at its receiving end, over a roll 20 mounted on the frame structure on a cross-shaft 21, and at its discharge end it operates about a roll 22 fixed on a cross-shaft 23; this latter shaft being supported in the frame structure and motor driven, as presently explained. At the receiving end of the swing conveyor, its frame structure is supported for pivotal swinging about a vertical axis or post 25 fixed thereto, for axial rotation in a bearing member 26 that is fixed to a supporting or base surface. This pivot post 25 is located at that corner of the swing frame structure that is adjacent the discharge end of the conveyor belt 10, and at that side toward which it swings in moving from alignment with the conveyor belt 10 to alignment with a conveyor belt 15.

At its outer end, the swing conveyor S is supported for travel by a pair of wheels 30—30 mounted thereon, as best shown in Fig. 7, with their axes radially aligned on post 25 to follow an arcuate track 31. This track is set in the floor surface, as shown in Fig. 6, and is curved arcuately about the axial line of pivot post 25. At the inner end corner thereof which is opposite the post 25, the swing frame S has a supporting wheel 34, and this wheel is set to follow an arcuate track 35 shown in Fig. 1 to be concentric of post 25.

The swinging of the frame structure S is such as to cause it to move from a position in alignment with the frame structure 13, as shown in Fig. 1, into alignment with the frame structure 14. When the swing frame is in receiving position, the receiving end of the conveyor belt 19 is closely adjacent the discharge end of belt 10, and at the same level. When the swing conveyor is in its discharge position, the discharge end of belt 19 is then closely adjacent the receiving end of discharge belt 15 and at the same level. The driving of the belt 10 is shown in Fig. 1a, to be effected by an electric motor 37 through a chain belt connection, as indicated at 38, and the motor circuit is shown to be controlled by a switch A presently to be described.

The conveyor belt 19 of the swing conveyor S is shown in Fig. 6 to operate about belt tightener rolls 40—41, and to be driven by an electric motor 44 which is supported in the swing frame structure below the belt. The driving connection comprises a sprocket chain belt 45 that operates about a sprocket wheel 46 on the drive shaft 23 of belt roller 22, and about a smaller sprocket wheel 47 on a shaft 48 driven by the motor 44. The motor 44 is under the automatic control of circuit switches presently to be identified in connection with the description of the mode of operation of the apparatus.

The gearing for oscillating the swing frame with the harmonic motion previously referred to is shown best in Figs. 3 to 6. In these views, 60 designates a vertical stub shaft that is fixedly mounted in a bearing 61 that, in turn, is fixed to a base plate or surface 62; the stub shaft 60 being located in alignment with the central vertical plane of the belt 10, and beneath its discharge end portion. Mounted for rotation on the upper end portion of the stub shaft 60 is a gear segment 64 and immediately thereabove and fixed rigidly to the gear segment, is a crank arm 65 which is operatively connected at its outer end, by pivot member 66 with a pitman or link 67 which, in turn, at its end is pivotally connected by a pivot pin 68 with the adjacent end of the swing frame structure 18 as shown in Fig. 3; the pin 68 being located in the central longitudinal plane of the swing frame and somewhat rearward of the transverse line of the pivot post 25 about which the conveyor structure S oscillates.

Fixedly mounted on the base plate 62, in a horizontal position, is an air cylinder 70. However, as I have previously indicated the power means may be a hydraulic cylinder or an electric, hydraulic or air motor. This contains a piston 71 with a piston rod 71' connected to one end of a rack bar 72 that is reciprocally supported by a guide bearing 73 in operative mesh with the gear segment 64. Reciprocal action of the piston and its rod in opposite directions in cylinder 70 is such as to cause the gear segment 64 to be rotated in opposite directions. In the present instance, rotation is through an arc of 180°. In one direction of its rotation, the gear 64 swings the crank arm 67 from its position of Fig. 5, and the pitman rod connection 67, between crank arm 65 and pivot 68, causes the swing frame S to oscillate about pivot post 25 from alignment with belt 10 into alignment with belt 15, as has been illustrated in Fig. 1. Opposite rotation of gear segment 64 returns the swing frame to starting position.

It will be understood that with the pivot member 25, so located, relative to pivot 60, and the crank arm 65, pitman 67 and pivot points 66 and 68 in the relationship shown in Fig. 3, the swinging movement of the conveyor S about pivot post 25, as caused by the crank arm and pitman connection will, at the start, be relatively slow but will gradually accelerate up to a maximum at about 90° of rotation of the crank, and will then decelerate gradually to a stop at the time the parts reach the full line positions of Fig. 5. The swing frame is returned to its starting position after discharge of the roll, by the same harmonic motion incident to the piston rod 71' being retracted onto the cylinder 70. It is understood that in view of the relatively slow starting and stopping of the swing frame movement, the inertia of the conveyor load will not operate to cause it to be displaced from the conveyor. Any loss of time due to the slow start or stop is made up for by the acceleration during the medial portion of the travel.

The control of the air cylinder 70 is effected by means diagrammatically shown in Fig. 4. In this view it is shown that the cylinder 70 has air line connections 80 and 81 opening into its opposite ends from a four way solenoid control valve 82; this valve being supplied with air under suitable operating pressure from a source of supply, not shown, through a supply line 83. Shifting of the valve 82 in one direction admits air to one end of cylinder 70 and exhausts it from the other end, thus to cause the piston 71 and its rod 71' to move outwardly to swing the frame S from the roll receiving position to roll discharge position. Shifting the valve to its opposite position reverses the application of air to the cylinder 70 and causes the swing frame to be moved back to starting position. The rate of application of air to opposite ends of the cylinder may be controlled by the manual setting of regulators 85—86, and by this means the rate of swinging in either direction is established. This provides that return speed of the unloaded conveyor can be made faster than its swing under load.

In Fig. 1, the circuit control switch A is shown to be mounted on side member 13a of frame 13. This has a switch actuator arm a extended therefrom into the path of the roll 11 to be engaged by the roll to open the switch, as the roll reaches the discharge end of belt 10. This switch A controls the circuit to motor 37 which drives the belt 10. Also, it is shown in Fig. 1, that a circuit control switch B, with contactor arm b is mounted adjacent the conveyor 13 in such position that the actuator arm will be engaged by a part of the frame S when the swing frame S is located in receiving position thus to cause the switch to be closed. Swinging of frame S from receiving position allows switch B to open.

Mounted on the outer end of the swing frame, is a switch C with a contactor arm c extended to a position at which a roll 11 advanced on belt 19 to the outer end of the conveyor will engage it and cause switch C to be opened. This switch C controls the flow of electric current to the conveyor belt driving motor 44. A fourth switch D with contactor arm d is located in a fixed position at which its contactor arm will be engaged by the swing frame S as it moves into roll discharging alignment with the conveyor belt 15 thus to close the switch. With these four switches and their contactor arms so located, and with the various circuits controlled by said switches as indicated in Fig. 8, operation is as follows:

Assuming that the feed conveyor 13 is in operation, and that a paper roll 11 is being advanced on the feed belt 10, and that the swing conveyor S is in receiving position, as shown in Fig. 1, and that its belt 19 is being driven in synchronism with belt 10 by the motor 44, the paper roll 11 will be advanced from belt 10 directly onto belt 19. However, should the swing conveyor not be in position to receive the paper roll 11 when the roll reaches the discharge end of belt 10, then the roll 11 upon engaging the contactor arm a of switch A opens the circuit to motor 38 and thus temporarily stops the motor 38 and the belt 10. However, when the swing frame S has returned fully to receiving position, a part thereof, as designated at x in Fig. 1, engages the contactor arm b of switch B and the switch B is closed. This switch overrides switch A and the motors 38 and 44 of both conveyors are energized to drive their respective conveyor belts 10 and 19. Thus the paper roll 11 will be moved from belt 10 onto the belt 19 and advanced thereby to the discharge end of the conveyor where it finally engages the contactor arm c of switch C and thus opens the electric circuit to motor 44 and stops the motor with the roll 11 located at the discharge end of the swing conveyor.

With the movement of a paper roll 11 from belt 10 of the feed conveyor onto the belt 19 of the swing conveyor S, and its clearance from the switch actuator arm $a$, the solenoid valve 82 is thus energized. This operates to admit air under pressure from supply line 83 through line 80 to the cylinder 70, causing the piston rod 71' to be extended and the rack bar 72 to be moved accordingly. As the rack bar 72 moves outwardly it rotates the gear segment 60 and the crank arm 65. This arm, through the pitman 67, imparts the desired harmonic motion to the swing conveyor frame. This swinging of the frame S takes place while the roll 11 is still being conveyed on belt 19 and continues until the conveyed roll 11 engages the switch contact arm $c$ at the outer end of the conveyor S and opens the circuit of motor 44. When the swing conveyor reaches the end of its swing, it stops in alignment with the discharge conveyor 15. As this takes place, a part of the swing frame engages the contactor arm $d$ of switch D and closes the circuits of the drive motors of both the swing conveyor and discharge conveyor, moving the paper roll from the swing conveyor onto the discharge conveyor.

When the roll 11 clears switch contactor $c$, the switch C opens and the swing conveyor drive motor stops. Also, this action of switch C effects deenergization of the solenoid valve 82 and an incident reversal of its position, thus causing the application of air to the cylinder 70 that causes return of the swing conveyor to starting position. As the swing conveyor again comes into alignment with the feed conveyor, the switch B is actuated to start another cycle of operations.

Having thus described my invention, what I claim as new therein and desire to secure by Letters Patent is:

1. The combination with a feed belt and a discharge belt operating along horizontal lines of travel that are in angular relationship and in the same horizontal plane and a swing conveyor with a conveyor belt operating therealong for the reception of articles directly thereonto from said feed belt while in alignment therewith, and adapted to be swung from that position into alignment with the discharge belt for the delivery of said articles therefrom, directly onto the discharge belt and without change in their direction of travel relative to the swing conveyor and a powered mechanism operable to swing said swing conveyor between article receiving and delivering positions.

2. The combination of a feed belt and a discharge belt operating along horizontal lines of travel that are in angular relationship and in the same horizontal plane, and a swing conveyor operating in a horizontal plane having a pivotal mounting at its receiving end about which it is adapted to be swung from direct alignment with the feed belt into alignment with the discharge belt, and comprising means thereon whereby articles received from the feed belt lengthwise thereof will be moved along the conveyor without change in their direction of travel relative to the conveyor for delivery therefrom onto the discharge belt lengthwise thereof, and powered means operable to effect the swinging of said swing conveyor between article receiving and discharge positions; said powered means including as a part thereof, devices whereby the conveyor is caused to be swung with an accelerated motion through an initial portion of the swing and a decelerated motion during the terminating portion of the swing.

3. The combination with a feed belt and a discharge belt operating along horizontal lines of travel that are in angular relationship to each other, and a swing conveyor located in position for alignment with the feed belt to receive articles directly thereonto at one end, and having a pivotal mounting at its receiving end about which it is adapted to be swung into alignment with the discharge belt for the delivery therefrom of a received article without change in its direction of travel relative to the swing conveyor, to the discharge belt; said swing conveyor comprising a frame structure, an article conveyor belt mounted therein, means for driving said belt and a power operated mechanism for swinging the conveyor frame about its pivotal mounting between its article receiving and discharge positions; said power operated means comprising a crank arm mounted for oscillation in a horizontal plane, a link pivotally connected at its opposite ends to the outer end of the crank arm and to the conveyor frame at a point offset from its pivot axis and powered means for oscillating the crank arm at uniform speed thus to cause the swing frame to move with accelerated movement during the first half of its swing and with decelerated movement during the final half of its swing.

4. The combination recited in claim 3 wherein said powered means for oscillating the crank arm comprises a reciprocally movable rack bar, means for effecting reciprocal action thereof in opposite directions at uniform speed, a gear segment mounted in operative mesh with the rack bar and adapted to be oscillated in opposite directions through an arc of 180°, by the reciprocal movements of the rack bar and means fixing said crank arm to said gear segment for turning therewith.

5. The combination recited in claim 4 wherein the crank arm and link move into alignment at the opposite limits of travel of the oscillating gear segment and the limits of the swinging motion of the conveyor frame.

References Cited in the file of this patent

UNITED STATES PATENTS

| 618,947 | McCutcheon | Feb. 7, 1899 |
| 1,458,859 | Soderberg | June 12, 1923 |
| 2,525,132 | Herts et al. | Oct. 10, 1950 |
| 2,724,486 | Hatch et al. | Nov. 22, 1955 |